(12) United States Patent
Mushikabe et al.

(10) Patent No.: US 10,237,392 B2
(45) Date of Patent: Mar. 19, 2019

(54) PARAMETER CONTROL DEVICE, PARAMETER CONTROL PROGRAM, AND PARAMETER CONTROL METHOD

(71) Applicant: YAMAHA CORPORATION, Hamamatsu-shi (JP)

(72) Inventors: Kazuya Mushikabe, Hamamatsu (JP); Tomoyoshi Akutagawa, Hamamatsu (JP); Yuki Yoshioka, Hamamatsu (JP)

(73) Assignee: YAMAHA CORPORATION, Hamamatsu-Shi (JP)

( * ) Notice: Subject to any disclaimer, the term of this patent is extended or adjusted under 35 U.S.C. 154(b) by 0 days.

(21) Appl. No.: 15/797,416

(22) Filed: Oct. 30, 2017

(65) Prior Publication Data

US 2018/0069957 A1 Mar. 8, 2018

Related U.S. Application Data

(63) Continuation of application No. PCT/JP2016/078592, filed on Sep. 28, 2016.

(30) Foreign Application Priority Data

Sep. 30, 2015 (JP) .................................. 2015-194505

(51) Int. Cl.
*H04M 1/725* (2006.01)
*H04B 17/23* (2015.01)
(Continued)

(52) U.S. Cl.
CPC ........ *H04M 1/72533* (2013.01); *G06F 3/165* (2013.01); *G08C 17/02* (2013.01);
(Continued)

(58) Field of Classification Search
CPC ........... H04M 1/72533; H04M 11/007; H04M 1/72583; H04M 2215/81; G06F 3/165; G06F 3/04847; G08C 17/02; G08C 2201/93; H04R 3/12; H04B 17/23; H04B 1/202; H04W 52/027
See application file for complete search history.

(56) References Cited

U.S. PATENT DOCUMENTS 9,674,610 B2 * 6/2017 Kim .................... H04R 3/12
2005/0200598 A1 * 9/2005 Hayes .................... H04B 1/202
345/156

(Continued)

FOREIGN PATENT DOCUMENTS

| JP | 2006129150 A | 5/2006 |
|----|--------------|--------|
| JP | 2014045232 A | 3/2014 |
| JP | 2015100085 A | 5/2015 |

OTHER PUBLICATIONS

International Search Report issued in Intl. Appln. No. PCT/JP2016/078592 dated Oct. 25, 2016. English translation provided.
(Continued)

*Primary Examiner* — Andrew Wendell
(74) *Attorney, Agent, or Firm* — Rossi, Kimms & McDowell LLP

(57) ABSTRACT

A control device includes: a display, at least one processor, and a memory configured to store a parameter and instructions that, when executed by the at least one processor, causes the control device to: determine whether a parameter of a controllable device can be changed, when the parameter of the controllable device is possible to change, display a first screen for manipulating the parameter of the controllable device on the display and update the parameter of the controllable device by user's manipulation, and when the parameter of the controllable device is not possible to change, display the second screen on the display and lock the parameter of the controllable device.

13 Claims, 13 Drawing Sheets

(51) Int. Cl.
*H04B 1/20* (2006.01)
*H04M 1/00* (2006.01)
*H04M 11/00* (2006.01)
*H04R 3/12* (2006.01)
*G06F 3/16* (2006.01)
*G08C 17/02* (2006.01)
*H04R 27/00* (2006.01)
*G06F 3/0484* (2013.01)

(52) U.S. Cl.
CPC ............ *H04M 1/00* (2013.01); *H04M 11/00* (2013.01); *H04R 3/12* (2013.01); *H04R 27/00* (2013.01); *G06F 3/04847* (2013.01); *G08C 2201/30* (2013.01); *G08C 2201/51* (2013.01); *G08C 2201/93* (2013.01); *H04R 2227/003* (2013.01); *H04R 2227/005* (2013.01); *H04R 2430/01* (2013.01)

(56) References Cited

U.S. PATENT DOCUMENTS

| | | | |
|---|---|---|---|
| 2012/0110452 A1* | 5/2012 | Hiipakka | G06F 3/04847 715/716 |
| 2012/0144299 A1* | 6/2012 | Patel | G06F 3/0488 715/702 |
| 2013/0038546 A1* | 2/2013 | Mineo | G06F 3/167 345/173 |
| 2015/0172743 A1 | 6/2015 | Itagaki | |
| 2016/0291925 A1 | 10/2016 | Kohara et al. | |
| 2017/0031648 A1* | 2/2017 | So | G06F 3/165 |
| 2017/0300224 A1* | 10/2017 | Negron | G06F 3/04883 |
| 2018/0091106 A1* | 3/2018 | Suyama | H04B 1/40 |

OTHER PUBLICATIONS

Written Opinion issued in Intl. Appln. No. PCT/JP2016/078592 dated Oct. 25, 2016.

* cited by examiner

PARAMETER CONTROL DEVICE, PARAMETER CONTROL PROGRAM, AND PARAMETER CONTROL METHOD

CROSS-REFERENCE TO RELATED APPLICATIONS

The present application is a continuation application of International Application No. PCT/JP2016/078592, filed Sep. 28, 2016, which claims priority to Japanese Patent Application No. 2015-194505, filed Sep. 30, 2015. The contents of these applications are incorporated herein by reference.

BACKGROUND OF THE INVENTION

Field of the Invention

The present invention relates to a parameter control device that controls parameters such as the volume values of a plurality of audio devices that are connected to each other, a parameter control program, and a parameter control method.

Description of Related Art

There have previously been formulated various guidelines, such as for example DLNA (Digital Living Network Alliance) that make possible a network between electronic devices such as audio devices in the home and portable terminals.

When a plurality of audio devices are connected to such a network, it is possible to synchronously play back an audio source such as for example a music source with the plurality of audio devices. Also, it is possible to use a terminal device such as a smartphone or the like connected to the network as a remote controller to operate the plurality of audio devices (for example, refer to Japanese Unexamined Patent Application Publication No. 2015-100085).

When synchronously playing back an audio source with a plurality of audio devices connected to a network, it is sometimes desired to for example uniformly raise or lower the volume value of the plurality of audio devices or to finely adjust individually the volume value of each audio device.

On the other hand, there are times when, among the plurality of audio devices that are connected, for example an audio device is included whose volume value cannot be adjusted. In the case of using a terminal device such as a smartphone as a remote controller, it is necessary to have the remote controller cope with such a combination in which an audio device is included whose volume value cannot be adjusted, for example.

SUMMARY OF THE INVENTION

One exemplary object of this invention is to provide a parameter control device, a parameter control program, and a parameter control method capable of coping with a case in which it is not possible to update a parameter of a controllable device such as an audio device.

A parameter control device according to a first aspect of the present invention includes: a display, at least one processor, and a memory configured to store a parameter and instructions that, when executed by the at least one processor, causes the control device to: determine whether a parameter of a controllable device can be changed, when the parameter of the controllable device is possible to change, display a first screen for manipulating the parameter of the controllable device on the display and update the parameter of the controllable device by user's manipulation, and when the parameter of the controllable device is not possible to change, display the second screen on the display and lock the parameter of the controllable device.

A device system according to a second aspect of the present invention includes: a controllable device configured to being capable of connecting with a subordinate device; and a parameter control device that includes a parameter updating unit, the parameter updating unit transmitting to the controllable device a command instructing update of a parameter. The controllable device controls the subordinate device to update the parameter of the subordinate device, upon receiving the command from the parameter control device.

A parameter control method according to a third aspect of the present invention includes: displaying a first screen for manipulating a parameter of a controllable device; displaying a second screen indicating that update of the parameter is not possible in a case where it is determined that the update of the parameter is not possible; updates the parameter; and fixing the parameter to a predetermined value in a case where it is determined that update of the parameter is not possible.

According to an embodiment of the present invention, it is possible to cope with a case in which it is not possible to update a parameter of a controllable device such as an audio device.

EMBODIMENTS FOR CARRYING OUT THE INVENTION

Figure 1:
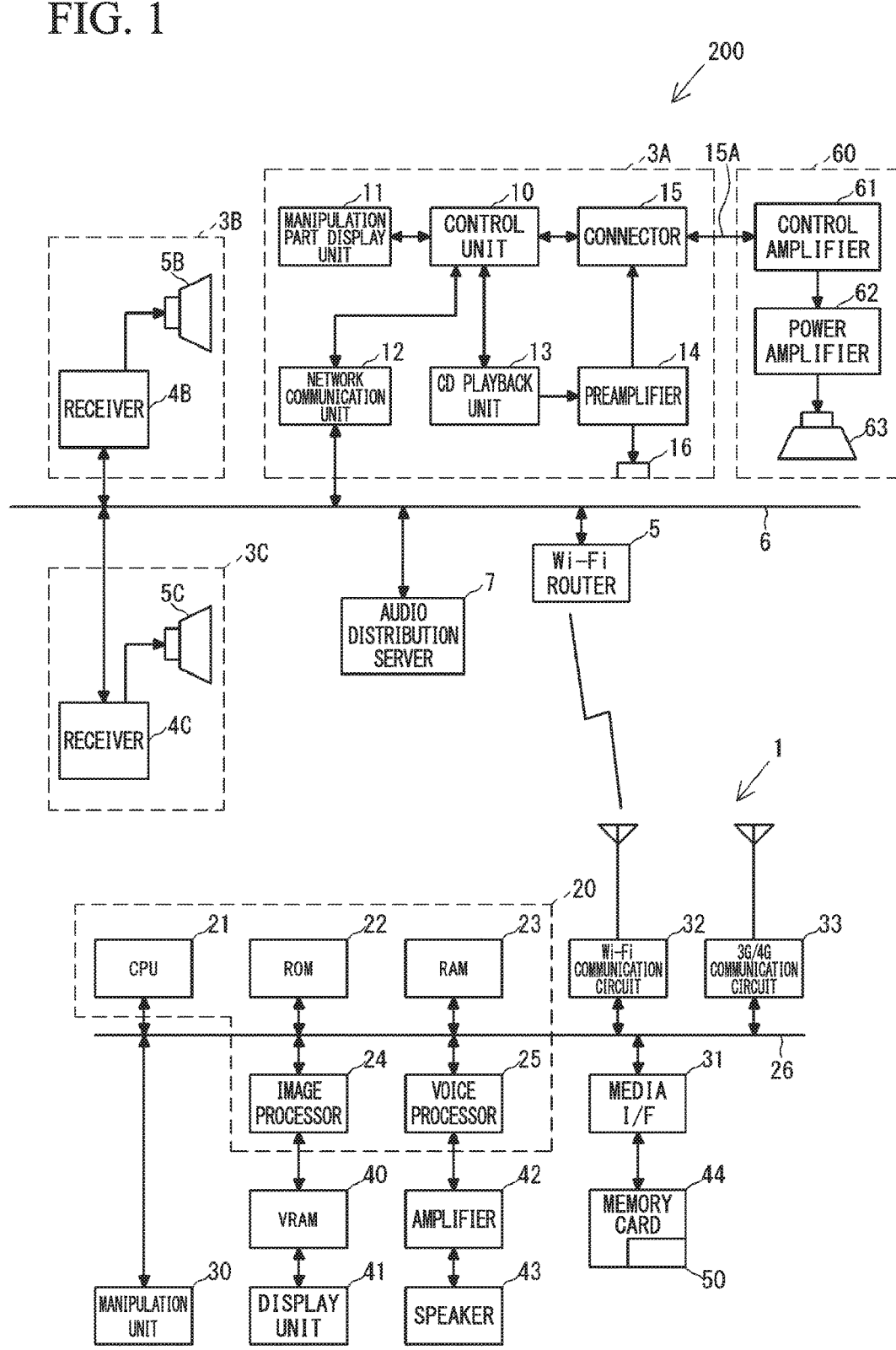
FIG. 1 is a block diagram of an audio system constituted by a mobile phone to which an embodiment of the present invention is applied and a plurality of audio devices.

FIG. 1 is a diagram that shows one example of an audio system 200 including a mobile phone 1 that is a terminal device to which an embodiment of this invention is applied and a plurality of audio devices 3A, 3B, and 3C. The audio system 200 includes the plurality of audio devices 3A, 3B, 3C, an audio distribution server 7, a speaker system 60, and a mobile phone 1. The plurality of audio devices 3A, 3B, 3C, the audio distribution server 7, and the mobile phone 1 are connected to a network 6. The network is for example a network that mutually connects audio devices that are installed in a plurality of rooms in one building. The audio devices 3A, 3B, 3C are controlled by the mobile phone 1 that functions as an audio system controller (controller). The speaker system 60 is connected to the audio device 3A. The controller is capable of controlling the volume and the like of the speaker system 60 via the audio device 3A. Even in a state in which the speaker system 60 is not connected to the audio device 3A, the audio device 3A functions as an audio device (which volume control is not possible). The audio devices 3A, 3B, 3C correspond to controllable devices of an embodiment of the present invention, and the speaker system 60 corresponds to a subordinate device of an embodiment of the present invention.

In the audio system 200, the plurality of audio devices 3A, 3B, and 3C can each play back an audio source such as a music source. In this embodiment, the case will be described of constructing a synchronized playback group in which the audio devices 3A, 3B, and 3C play back the same audio source synchronously. In a synchronous playback group, one audio device operates as the master device, and the other audio devices operate as slave devices. The master device plays back an audio source as a representative of the group and transmits the audio signal that is played back via the network 6 to the slave audio devices. The user can perform setting/changing of the synchronous playback group and assigning of the master device to any of the audio devices by manipulating the mobile phone 1 (controller).

In the present embodiment, the case of the function as a master device being assigned to the audio device 3A and the case of the function as a slave device being assigned to the audio device 3A will both be described. Moreover, the case of the speaker system 60 being connected to the audio device 3A (the case of volume control being possible by the audio device 3A) and the case of the speaker system 60 not being connected to the audio device 3A (the case of volume control not being possible by the audio device 3A) will both be described.

The synchronous playback group does not need to be constituted by all of the plurality of audio devices connected to the network, and may be constituted by an audio device group of a selected portion. For example, among the three audio devices 3A, 3B, and 3C that are connected to the network, a synchronous playback group may be constituted by the audio devices 3A and 3B. The synchronous playback group may also constituted by four or more audio devices.

The audio distribution server 7 is a network storage that is capable of storage and distribution of an audio source such as a music source. A music source or the like that is played back by the audio devices 3A, 3B, and 3C is stored in the audio distribution server 7. The audio devices 3A, 3B, and 3C can select the audio distribution server 7 as one of the audio sources. In the synchronous playback group, the master device can synchronously play back an audio source received from the audio distribution server 7 by audio devices within the group.

The audio device 3A includes a control unit 10, a manipulation part display unit 11, a network communication unit 12, a CD playback unit 13, a preamplifier 14, a connector 15, and an earphone jack 16. Since the audio device 3A does not include a speaker, it is not possible to emit sound solely with the audio device 3A even when playing back an audio source. Since the audio device 3A does not include a control amplifier for adjusting the volume (volume value), it does not have a volume regulating function, either.

The control unit 10 controls the function of audio device 3A, and controls the audio devices 3B and 3C via the network 6. The control unit 10 is connected to the network 6 via a network communication unit 12. The speaker system 60 is connected to the control unit 10 via the connector 15 and a cable 15A. The control unit 10 outputs an audio signal acquired by playing back a music source received from the audio distribution server 7 to the speaker system 60. The manipulation part display unit 11 displays a manipulation part for selection of an audio source and selecting or adjusting functions of the audio device 3A.

The CD playback unit 13 is capable of playing back a CD (Compact Disc) on which an audio source such as a music source is recorded. When the audio device 3A is the master device, it is possible to synchronously play back the audio source recorded on the CD by the audio devices 3A, 3B, and 3C that belong to the group.

The preamplifier 14 amplifies the weak audio signal obtained by playing back the audio source to a level that can be conveyed and processed. The preamplifier 14 is not provided with a function to adjust the volume (volume value) of audio device 3A.

The earphone jack 16 is connected to the preamplifier 14. By connecting an earphone to the earphone jack 16, sound can be outputted based on the audio signal from the audio device 3A. Since the audio device 3A is not provided with a volume adjustment function, it is not possible to adjust the volume of the earphone solely with the audio device 3A.

By connecting the speaker system 60 to the audio device 3A, it is possible to emit sound based on the audio signal from audio device 3A. The speaker system 60 includes a control amplifier 61, a power amplifier 62, and a speaker 63. The control amplifier 61 adjusts the volume value and the sound quality of the sound being emitted by the audio device 3A. The power amplifier 62 performs power amplification upon receiving the output from the control amplifier 61, and drives the speaker 63. The case where the speaker 63 is contained in the speaker system 60 has been described. However, the speaker 63 may also be an external speaker.

The cable 15A contains the audio cable and the control cable. The audio cable supplies the audio signal amplified by the preamplifier 14 to the control amplifier 61 of the speaker system 60. The control cable connects the control unit (control amplifier 61) of the speaker system 60 and the control unit 10 of the audio device 3A. The control unit 10 transmits commands, such as volume adjustment and tone control, to the control amplifier 61, and the control amplifier 61 replies to the control unit 10 with the configuration content, such as the present volume and sound quality. Thereby, the control unit 10 of the audio device 3A can carry out volume adjustment of the speaker system 60 and can find out the volume setting value of the speaker system 60 via the cable 15A.

The audio devices 3B and 3C respectively have receivers 4B and 4C. The receivers 4B and 4C are each connected to the network 6. The speakers 5B and 5C are connected to the receivers 4B and 4C, respectively. The speakers 5B and 5C emit sound on the basis of the audio source received from the audio distribution server 7 or the audio source played back by the CD playback unit 13.

As for the mobile phone 1, the type known as a smartphone is preferred. The mobile phone (smartphone) 1 has a 3G/4G communication function, which are mobile communication networks, has a wireless LAN (Wi-Fi) communication function, and is connected to the network 6 via a Wi-Fi router 5.

The mobile phone 1 functions as an audio system controller 100 (hereinbelow simply referred to as the controller 100) by starting an audio system controller program 50 (hereinbelow simply referred to as the program 50) that is an application program (app). The mobile phone 1 controls the audio devices 3A, 3B, and 3C via the network 6 in accordance with user manipulation. The control functions include audio source selection, power on/off, raising and lowering of the volume value, and the like. Control of the volume value in the controller 100 is performed by a slide manipulation on a slider 418 displayed in the controller 100. The controller 100 may transmit a command to the control unit 10, and the control unit 10 may control the receivers 4B and 4C.

The constitution of the mobile phone 1 will be described in detail. The mobile phone 1 includes, on a bus 26, a control unit 20, a manipulation unit 30, a media interface 31, a Wi-Fi communication circuit 32, and a 3G/4G communication circuit 33. The control unit 20 includes a CPU 21, a ROM (flash memory) 22, a RAM 23, an image processor 24, and a voice processor 25. A video RAM (VRAM) 40 is connected to the image processor 24. A display unit 41 is connected to the VRAM 40. The display unit 41 includes a liquid crystal display and displays a standby screen, a telephone number, and the like. The screen of the controller 100 described below is also displayed on the display unit 41. An amplifier 42 including a D/A converter is connected to the voice processor 25. A speaker 43 is connected to the amplifier 42.

The image processor 24 includes a GPU (Graphics Processing Unit) that generates various images, such as a standby window, telephone numbers, and the like. When the program 50 is started, the image processor 24 generates an image of an audio system controller according to instructions of the CPU 21 and expands this on the VRAM 40. The image expanded on the VRAM 40 is displayed on the display unit 41.

The voice processor 25 has a DSP (Digital Signal Processor) that encodes/decodes communication audio. The sound processor 25 outputs the decoded/generated audio to the amplifier 42. The amplifier 42 amplifies this audio signal and outputs it to the speaker 43.

The Wi-Fi communication circuit 32 performs wireless communication in the IEEE 802.11g standard with the Wi-Fi router 5, and performs transmission and reception of data and messages with devices on the network 6 such as the control unit 10, and 4B, and 4C. Messages are exchanged between the control unit 10, and 4B and 4C in a predefined format similar to DLNA (Digital Living Network Alliance). The 3G/4G communication circuit 33 performs voice calls and data communication via a mobile telephone communication network. Downloading of application programs is performed via data communication. An application program is not restricted to downloading by 3G/4G communication, and may be acquired via Wi-Fi communication or an interface such as USB.

The manipulation unit 30 includes a touch panel formed on the display unit 41, and detects a touch manipulation, a slide manipulation or the like on the touch panel. A memory card 44 is connected to the media interface 31. The memory card 44 is, for example, a microSD card. An application program downloaded from the server by the 3G/4G communication circuit 33 is stored in the memory card 44 or the ROM 22. In this mobile phone 1, the program 50 (application program) is stored in the memory card 44.

The program 50 contains, in addition to the program body, data required for execution of the program. Data required for execution of a program are, for example, a command table and the like. A command table is a table that associates control contents for the audio devices 3A, 3B, and 3C and commands that express those control contents. The command table stores commands such as turning on/off the power of the control unit 10 and the receivers 4B and 4C, raising/lowering the volume, and selecting the audio distribution server 7/CD playback unit 13 as the audio source and the like.

A basic program for executing a telephone call and application programs on this mobile phone 1 is stored in the ROM 22. The ROM 22 is a flash memory and it is also capable of storing downloaded application programs in addition to the basic program. The work area used when the CPU 20 executes a program 50 is set in the RAM 23. For example, the timer area, counter area, flag area, and the like of each type of data are provided in the work area.

Figure 2:
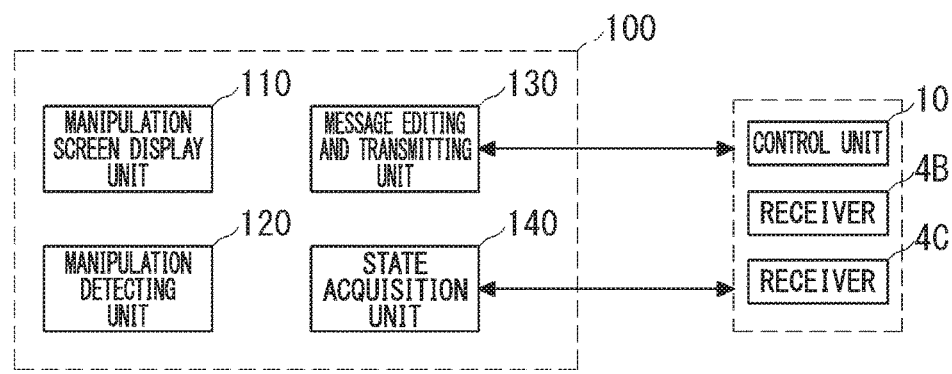
FIG. 2 is a function block diagram of an audio system controller constituted by collaboration of the mobile phone and an audio system controller program, in the embodiment of the present invention.

The mobile phone 1 constitutes the controller 100 as shown in FIG. 2 by collaboration with the program 50 stored in the memory card 44, and transmits a command message to the control unit 10 via Wi-Fi to control the control unit 10. Control of the receivers 4B and 4C is performed via the control unit 10.

Referring to the function block diagram of FIG. 2, the controller 100 that is realized by the program 50 being read into the mobile phone 1 (hardware) will be described. The controller 100 includes a manipulation screen display unit 110, a manipulation detecting unit 120, a message editing and transmitting unit 130, and a state acquisition unit 140.

The manipulation screen display unit 110 is realized by collaboration of the control unit 20, the VRAM 40, the display unit 41, and the program 50, and displays various manipulation screens in the display unit 41 of the mobile phone 1.

The manipulation detecting unit 120 is realized by collaboration of the control unit 20, the manipulation unit 30, and the program 50. The manipulation detecting unit 120 detects manipulations on the manipulation screen displayed on the display unit 41, for example, touch manipulations and slide manipulations. The manipulation information detected by the manipulation detecting unit 120 is input to the manipulation screen display unit 110, the message editing and transmitting unit 130, and the like.

The message editing and transmitting unit 130 is realized by coordination of the control unit 20, the Wi-Fi communication circuit 32, and the program 50. The message editing and transmitting unit 130, on the basis of manipulation information input from the manipulation detecting unit 120, reads out a command corresponding to the manipulation information from the command table and edits a command message. The message editing and transmitting unit 130 transmits that command message to the control unit 10 and the receivers 4B and 4C. The message editing and transmitting unit 130 corresponds to the parameter updating unit of an embodiment of the present invention.

A state acquisition unit 140 is realized by coordination of the control unit 20, the Wi-Fi communication circuit 32, and the program 50. The state acquisition unit 140 queries the control unit 10 and the receivers 4B and 4C and acquires the operation states of the audio devices 3A, 3B, and 3C. Operation state may include, for each of the audio devices 3A, 3B, and 3C, selectable or adjustable items at that time and the connection state of each device. A selectable item may include for example an input source, and an adjustable item may include for example a volume value. This query is performed during startup of the controller 100, during startup of the control unit 10 and the receivers 4B and 4C, or appropriately (for example, every 5 seconds, directly after transmission of a command message, or the like).

In the state of the speaker system 60 being connected to the audio device 3A, when an operation state query from the state acquisition unit 140 is made to the audio device 3A, the audio device 3A replies to the state acquisition unit 140 to information indicating that the speaker system 60 is connected, or to information indicating that adjustment of the volume value is possible. Thereby, the operation state of the audio device 3A is acquired by the state acquisition unit 140. In the state of the speaker system 60 not being connected to the audio device 3A, in response to an operation state query to the audio device 3A from the state acquisition unit 140, the audio device 3A replies to the state acquisition unit 140 to information indicating that the speaker system 60 is not connected, or to information indicating that adjustment of the volume value is not possible. Thereby, the operation state of the audio device 3A is acquired by the state acquisition unit 140. The information regarding volume adjustability acquired by the state acquisition unit 140 is reflected in the display of the manipulation screen 400 (for example, refer to FIG. 3 and FIG. 10). In the case of the speaker 63 of the speaker system 60 being an external speaker, the object of determination with respect to being connected to the audio device 3A becomes the amplifier system (61 and 62).

Figure 14:
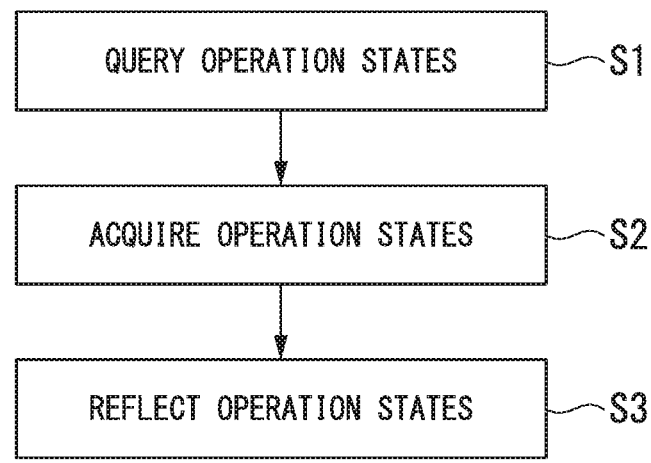
FIG. 14 shows a flowchart for describing an operation of the audio system controller shown in FIG. 2.

FIG. 14 shows a flowchart for describing an operation of the controller 100. More specifically, the flow chart illustrates the case where the controller 100 reflects the operation state of the audio device 3A in the display of the manipulation screen 400. In step S1, the controller 100 queries the audio device 3A. In step S2, the controller 100 acquires the operation state of the audio device 3A from the audio device 3A. In step S3, the controller 100 reflects the operation state of the audio device 3A in the display of the manipulation screen 400.

FIGS. 3 to 13 are diagrams that show examples of the manipulation screen 400 displayed by the manipulation screen display unit 110. In the present embodiment, the display of the manipulation screen 400 differs between the case of the function as a master device being assigned to the audio device 3A and the case of the function of a slave device being assigned to the audio device 3A. It also differs between the case of the speaker system 60 being connected to the audio device 3A whereby the volume value of the audio device 3A is adjustable, and the case of the speaker system 60 not being connected to the audio device 3A whereby the volume value of the audio device 3A is not adjustable. Therefore, descriptions of the display of the manipulation screen 400 will be given for four separate cases below:

1. The case of the audio device 3A being a master device, and volume adjustment of the audio device 3A being possible;

2. The case of the audio device 3A being a slave device, and volume adjustment of the audio device 3A being possible;

3. The case of the audio device 3A being a master device, and volume adjustment of the audio device 3A not being possible; and 4. The case of the audio device 3A being a slave device, and volume adjustment of the audio device 3A not being possible.

[1. The Case of the Audio Device 3A being a Master Device, and Volume Adjustment of the Audio Device 3A being Possible]

First, the case of the function as a master device being assigned to the audio device 3A, and the speaker system 60 being connected to the audio device 3A, whereby the volume value of the audio device 3A can be adjusted, is described.

Figure 3:
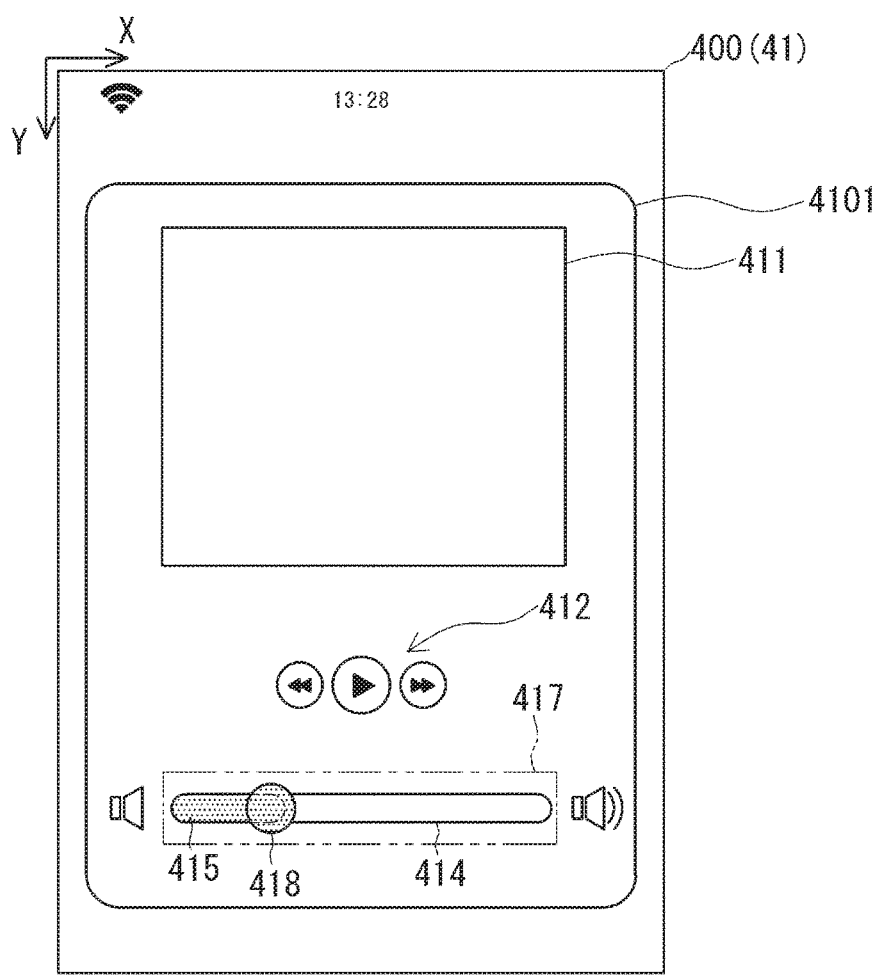
FIG. 3 is a diagram showing an example of a screen display of the audio system controller shown in FIG. 2.

FIG. 3 shows the state in which the playback control screen 4101 of the audio device 3A, which is the current master device, is displayed in the manipulation screen 400. The manipulation screen 400 is displayed in the display unit 41. The user can manipulate the manipulation screen 400 by the touch panel (manipulation unit 30) overlaid on the display unit 41. In order to ascertain the position of the touch manipulation or the slide manipulation (a manipulation of moving a touch location while maintaining contact), a coordinate axis is set on the touch panel (manipulation unit 30). In the present embodiment, the upper left of the diagram of the touch panel (manipulation unit 30) serves as the origin, and the X axis is set rightward from the origin in the figure, while the Y axis is set downward from the origin in the figure. A touch manipulation or a slide manipulation is ascertained as change in the coordinates of the position where a finger contacts the touch panel (manipulation unit 30). In the following description, the positions of the components in the display unit 41 are described with the directions (vertical, horizontal) of the orientation shown in FIG. 3.

In the playback control screen 4101, an image 411 associated with the selected audio source, a playback button group 412, a bar graph display area 414, a bar graph 415, a slider display area 417, and a slider 418 are displayed. The bar graph display area 414, the bar graph 415, the slider display area 417, and the slider 418 are displayed in the playback control screen 4101 if volume adjustment of the audio device 3A is possible. When volume adjustment of the audio device 3A is not possible, the bar graph display area 414, the bar graph 415, the slider display area 417, and the slider 418 are not displayed (refer to FIG. 10).

The playback button group 412 has a playback and stop button, a fast forward button, and a rewind button. Touch manipulations of the buttons are detected by the manipulation detecting unit 120, and the manipulation information is conveyed to the message editing and transmitting unit 130. When the playback button is tapped, the message editing and transmitting unit 130 transmits the playback start command or stop command to the control unit 10 of the audio device 3A in accordance with the playback state at that time. When the fast forward button is tapped (touched), the message editing and transmitting unit 130 transmits the next song command or fast forward command to the control unit 10 of the audio device 3A in accordance with the playback state at that time. When the rewind button is tapped, the message editing and transmitting unit 130 transmits the previous song command or rewind command to the control unit 10 of the audio device 3A in accordance with the playback state at that time.

The bar graph 415 is displayed in the bar graph display area 414. The bar graph 415 is a graph showing the volume value. The bar graph 415 extends rightward (the positive direction on the X axis) in accordance with an increase of the volume value and contracts leftward (the negative direction on the X axis) in accordance with a decrease of the volume value, with the left end of the bar graph display area 414 serving as the origin. The volume value is expressed by the position of the right end of the bar graph 415.

The slider display area 417 covers the entire bar graph display area 414. The slider 418 is displayed at the position corresponding to the volume value at that time, or a user manipulation.

The slider 418 increases and decreases the volume value by a slide manipulation. In FIG. 3, the slider 418 is disposed overlapping the right end part of the bar graph 415. It is possible to move the slider 418 rightward and leftward along the X axis by a slide manipulation of the user. When the slider 418 is moved rightward, the volume value of the audio device 3A will increase. When the slider 418 is moved leftward, the volume value of the audio device 3A will decrease.

When the slider 418 undergoes a slide manipulation to the right or to the left by the user, the manipulation information of the slide manipulation is detected by the manipulation detecting unit 120 and conveyed to the message editing and transmitting unit 130 and the manipulation screen display unit 110. The message editing and transmitting unit 130 edits a command message that indicates an update of the volume value, and transmits the command message to the control unit 10 of the audio device 3A. The manipulation screen display unit 110 updates the display content of the bar graph display area 414 and slider display area 417 in accordance with the manipulation content.

Figure 4:
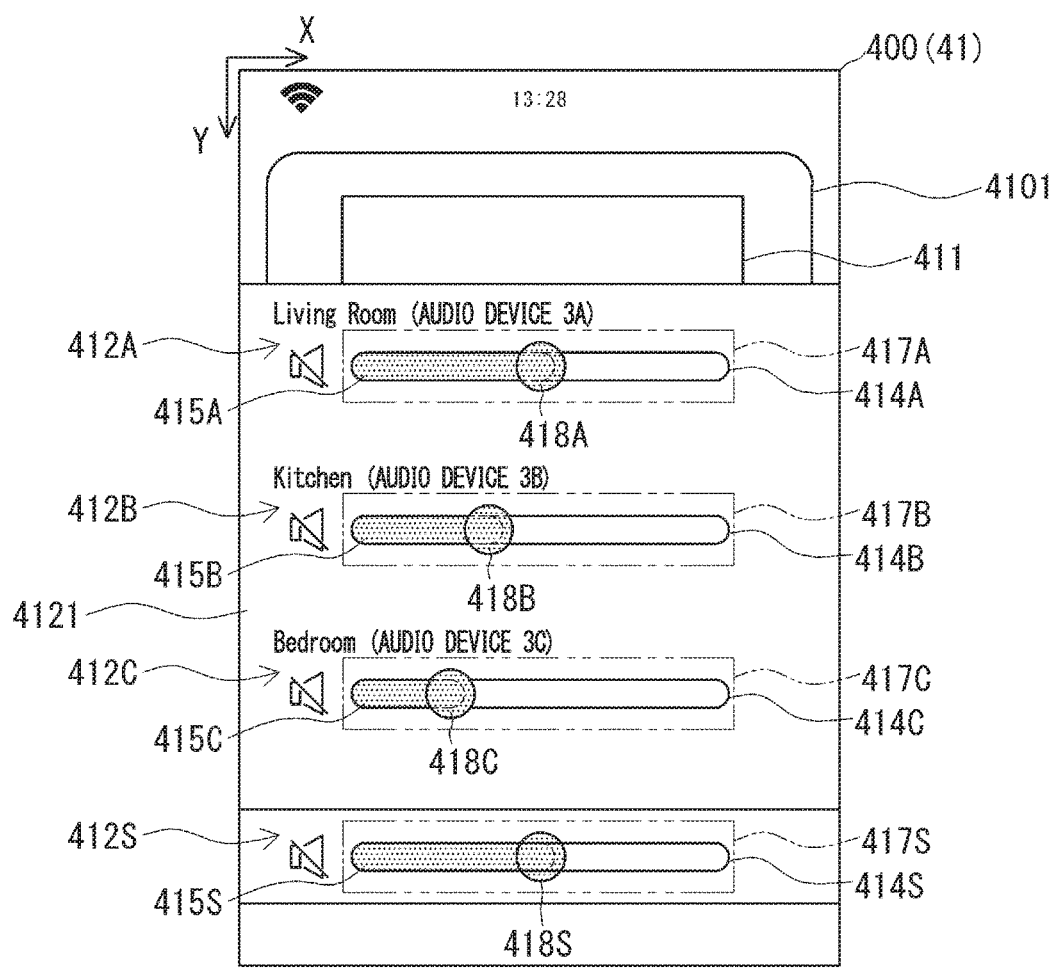
FIG. 4 is a diagram showing an example of a screen display of the audio system controller shown in FIG. 2.

FIG. 4 shows the state in which the volume control screen 4121 is displayed that adjusts the volume values of the audio devices 3A, 3B, and 3C individually or interlockingly. The volume control screen 4121 is displayed when performing volume control of a synchronous playback group. In FIG. 4, the volume control screen 4121 is displayed so as to overlap the playback control screen 4101.

The volume control screen 4121 has a synchronous control display region 412S and individual control display regions 412A, 412B, and 412C.

In the synchronous control display region 412S, a bar graph display area 414S, a bar graph 415S, a slider display area 417S, and a slider 418S are displayed. By manipulating the slider 418S, it is possible to synchronously control the volume values of the audio devices 3A, 3B, and 3C. The slider 418S corresponds to an interlocking manipulatable part of an embodiment of the present invention. An image for synchronous control is displayed in the synchronous control display region 412S when volume adjustment of the master device is possible. When volume adjustment of the master device is not possible, an image is not displayed in the synchronous control display region 412S (refer to FIG. 11).

An image for individually controlling the volume value of the master device is displayed in the individual control display region 412A. In FIG. 4, the function of the master device is assigned to the audio device 3A. For this reason, an image for individually controlling the volume value of the audio device 3A is displayed in the individual control display region 412A. A bar graph display area 414A, a bar graph 415A, a slider display area 417A, and a slider 418A are displayed in the individual control display region 412A. By manipulating the slider 418A, it is possible to individually control the volume value of the audio device 3A. In the present embodiment, the audio device 3A is set to be installed in a living room (Living Room). The slider 418A corresponds to an individual manipulatable part of the embodiment of the present invention.

Figure 11:
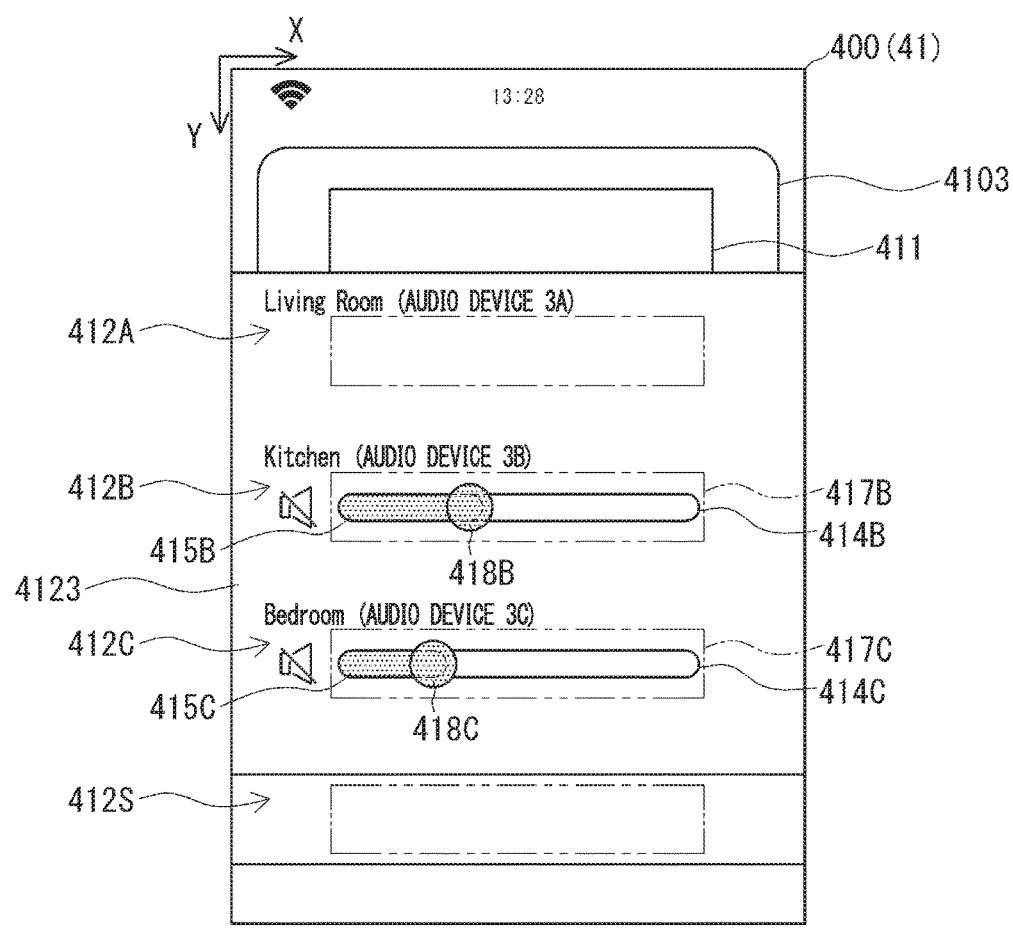
FIG. 11 is a diagram showing an example of a screen display of the audio system controller shown in FIG. 2.

Even in the case of the function of the master device being assigned to the audio device 3A, when volume adjustment of the audio device 3A is not possible, the bar graph 415A and the slider 418A of the individual control display region 412A are not displayed (refer to FIG. 11).

Images for individually controlling the volume values of the slave devices are shown in the individual control display regions 412B and 412C. In FIG. 4, an image for carrying out individual control of the volume value of the audio device 3B is displayed in the individual control display region 412B. Also, an image for carrying out individual control of the volume value of the audio device 3C is displayed in the individual control display region 412C.

A bar graph display area 414B, a bar graph 415B, a slider display area 417B, and a slider 418B are displayed in the individual control display region 412B. By manipulating the slider 418B, it is possible to carry out individual control of the volume value of the audio device 3B. In this embodiment, the audio device 3B is set to be installed in a kitchen (Kitchen). The slider 418B is equivalent to an individual manipulatable part of an embodiment of this invention.

A bar graph display area 414C, a bar graph 415C, a slider display area 417C, and a slider 418C are displayed in the individual control display region 412C. By manipulating the slider 418C, it is possible to carry out individual control of the volume value of the audio device 3C. In this embodiment, the audio device 3C is set to be installed in a bedroom (Bedroom). The slider 418C is equivalent to an individual manipulatable part of an embodiment of this invention.

The display of the synchronous control display region 412S will be described in detail. The bar graph 415S of a length corresponding to the volume value of the current audio device 3A is displayed in the bar graph display area 414S of the synchronous control display region 412S.

The bar graph 415S extends rightward (the positive direction on the X axis) in accordance with an increase of the volume value and contracts leftward (the negative direction on the X axis) in accordance with a decrease of the volume value, with the left end of the bar graph display area 414S serving as the origin.

The slider display area 417S covers the entire bar graph display area 414S. The slider 418S is displayed at the position corresponding to the volume value at that time, or a user manipulation.

The slider 418S increases and decreases the volume value by a slide manipulation. In FIG. 4, the slider 418S is disposed overlapping the right end part of the bar graph 415S. It is possible to move the slider 418S rightward and leftward along the X axis by a slide manipulation of the user. When the slider 418S is moved rightward, the volume value will increase. When the slider 418S is moved leftward, the volume value will decrease.

When the slider 418S undergoes a slide manipulation to the right or to the left by the user, the manipulation information of the slide manipulation is detected by the manipulation detecting unit 120 and conveyed to the message editing and transmitting unit 130 and the manipulation screen display unit 110. The message editing and transmitting unit 130 edits a command message that indicates an update of the volume value, and transmits the command message to the control unit 10. The manipulation screen display unit 110 updates the display content of the bar graph display area 414S and slider display area 417S in accordance with the manipulation content.

The individual control display regions 412A, 412B, and 412C respectively correspond to the audio devices 3A, 3B, and 3C. Since the display of the individual control display regions 412A, 412B, and 412C is in common with the display of the synchronous control display region 412S, a detailed description thereof will be omitted.

Next, referring to FIG. 5 to FIG. 7, a description will be given of control that uniformly (synchronously) or individually raises and lowers the volume value of the audio devices 3A, 3B, and 3C with the controller 100 of the present embodiment.

First, referring to FIG. 5, the case will be described of uniformly controlling the volume value of the audio devices 3A, 3B, and 3C by synchronous control. FIG. 5 shows an example of a manipulation to increase the volume value by sliding to the right along the X axis the slider 418S, which is the interlocking manipulatable part of the synchronous control display region 412S.

Figure 5:
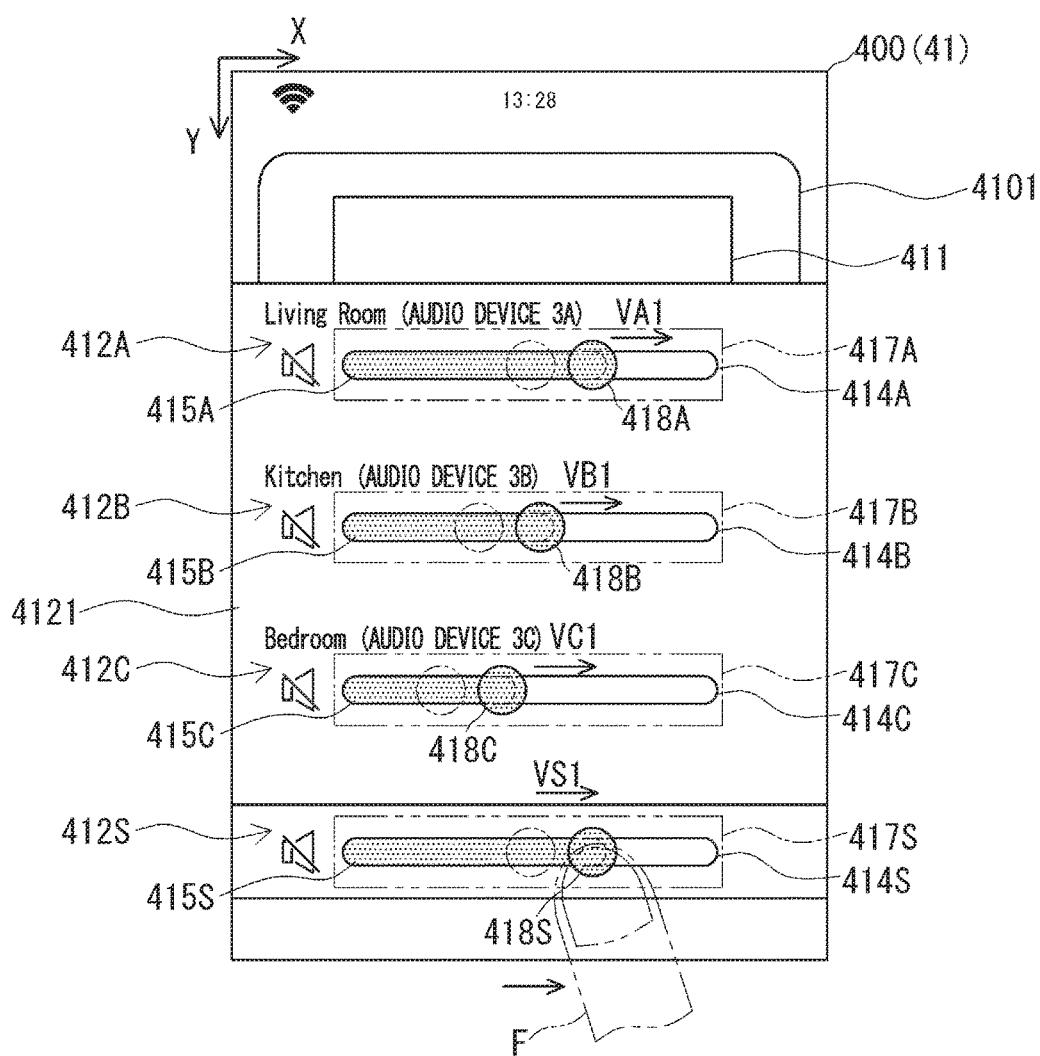
FIG. 5 is a diagram that describes a state of performing volume control by a slide manipulation in the embodiment of the present invention.

In FIG. 5, the slider 418S moves in the volume increasing direction (rightward) accompanying the slide manipulation by the user's finger F, and the bar graph 415S also extends in the volume increasing direction accompanying the movement of the slider 418S. The movement amount of the slider 418S in the volume increasing direction is VS1.

Accompanying the movement of the slider 418S in the volume increasing direction (rightward), the sliders 418A, 418B, and 418C, which are individual manipulatable parts of the individual control display regions 412A, 412B, 412C, also move uniformly in the volume increasing direction (rightward). The movement amounts of the sliders 418A, 418B, and 418C are respectively VA1, VB1, and VC1. In this case, the movement amounts VA1, VB1, and VC1 are equivalent to the movement amount VS1 of the slider 418S (VA1=VB1=VC1=VS1). That is, the movement of the sliders 418A, 418B, and 418C, which are individual manipulatable parts, is interlocked with the movement of the slider 418S, which is an interlocking manipulatable part. Also, the bar graphs 415A, 415B, and 415C extend in the volume increasing direction accompanying the movement of the respective sliders 418A, 418B, and 418C.

When a user completes the slide manipulation on the slider 418S, the synchronous control of a volume value ends. The volume values of the audio devices 3A, 3B, and 3C are finalized at the moment when manipulation of the slider 418S is stopped.

In this way, it is possible to uniformly control the volume values of the audio devices 3A, 3B, and 3C connected to the network by manipulating the slider 418S, which is the interlocking manipulatable part.

Next, referring to FIG. 6, the case of individually controlling the volume value of the audio device 3A, which is the master device, will be described. FIG. 6 shows an example of the manipulation of sliding the slider 418A, which is an individual manipulatable part, rightward along the X axis to increase the volume value of the audio device 3A.

Figure 6:
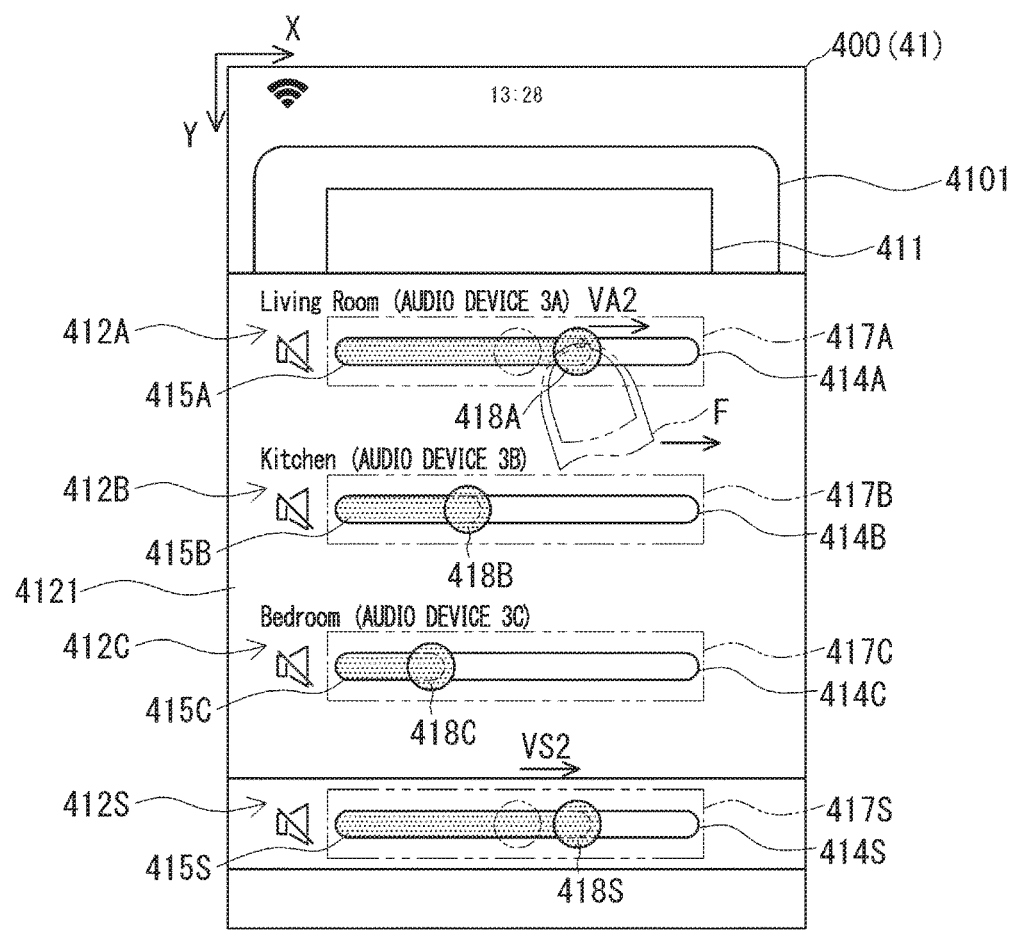
FIG. 6 is a diagram that describes a state of performing volume control by a slide manipulation in the embodiment of the present invention.

In FIG. 6, the slider 418A moves in the volume increasing direction (rightward) accompanying the slide manipulation by the user's finger F, and the bar graph 415A also extends in the volume increasing direction accompanying the movement of the slider 418A. The movement amount of the slider 418A in the volume increasing direction is VA2.

Accompanying the movement of the slider 418A in the volume increasing direction (rightward), the slider 418S, which is an interlocking manipulatable part, also moves in the volume increasing direction (rightward). The movement amount of the slider 418S is VS2. In this case, the movement amount VS2 is equivalent to the movement amount VA2 of the slider 418A (VA2=VS2). Also, the bar graph 415S extends in the volume increasing direction accompanying the movement of the slider 418S.

That is, the volume value of audio device 3A, which is the master device, rises corresponding to the movement amount of the slider 418A and the bar graph 415A. When the slider 418A corresponding to the master device is manipulated, in response the slider 418S, which is an interlocking manipulatable part, also moves in the volume increasing direction (rightward) by the same movement amount as the slider 418A.

When a user completes the slide manipulation on the slider 418A, individual control of the volume value of the audio device 3A ends. The volume value of the audio device 3A is finalized at the moment when manipulation of the slider 418A is stopped.

In this way, it is possible to individually control the volume value of the corresponding audio device 3A, among the audio devices 3A, 3B, and 3C connected to the network, by manipulating the slider 418A, which is an individual manipulatable part. For this reason, it is possible to adjust only the volume value of the audio device 3A.

Also, when the slider 418A corresponding to the audio device 3A, which is the master device, is manipulated, the slider 418S, which is an interlocking manipulatable part, moves following the slider 418A. For this reason, it is possible to match the positions of the slider 418A of the master device and the slider 418S for synchronized control.

Figure 7:
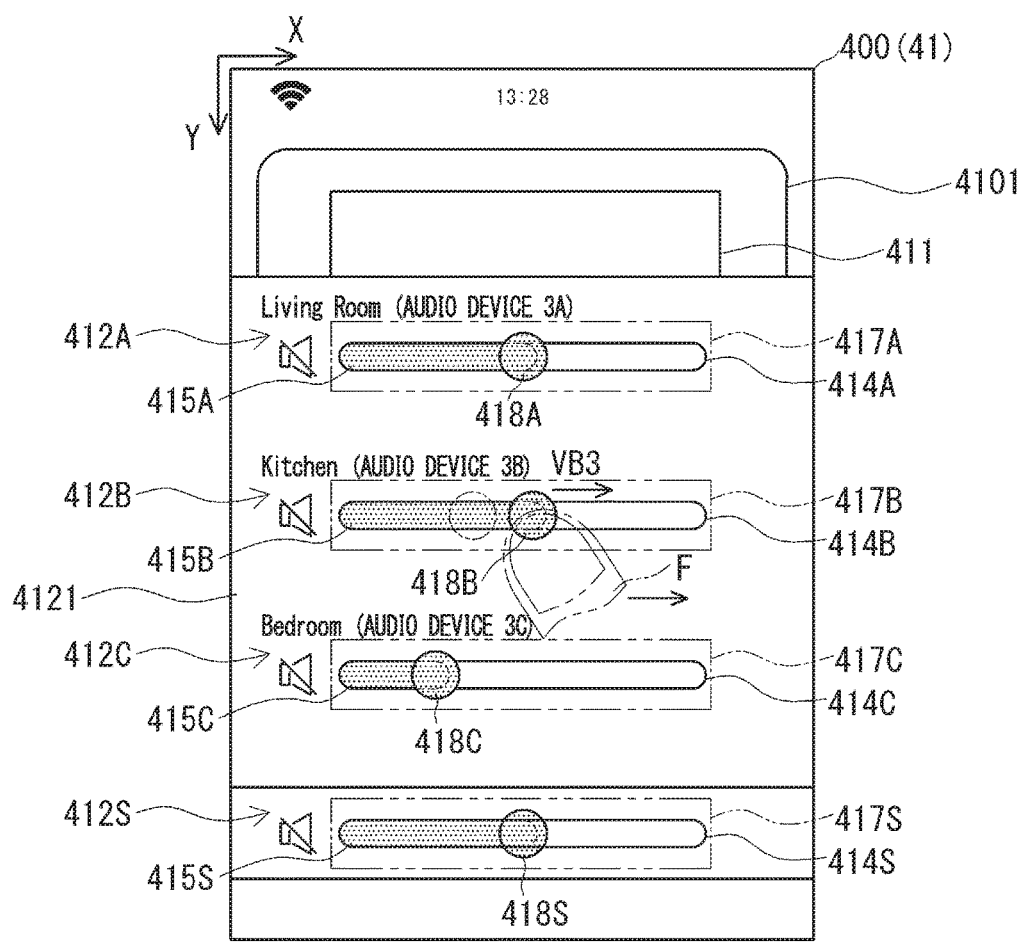
FIG. 7 is a diagram that describes a state of performing volume control by a slide manipulation in the embodiment of the present invention.

Next, referring to FIG. 7, the case of individually controlling the volume value of the audio device 3B, which is a slave device, is described. FIG. 7 shows an example of the manipulation of sliding the slider 418B, which is an individual manipulatable part, rightward along the X axis to increase the volume value of the audio device 3B.

In FIG. 7, the slider 418B moves in the volume increasing direction (rightward) accompanying the user's slide manipulation, and the bar graph 415B also extends in the volume increasing direction accompanying the movement of the slider 418B. The movement amount of the slider 418B in the volume increasing direction is VB3.

Even if the slider 418B is moved in the volume increasing direction (rightward), the other sliders 418S, 418A, and 418C will not move.

That is, the volume value of audio device 3B, which is a slave device, rises corresponding to the movement amount of the slider 418B and the graph 415B. However, the other sliders 418S, 418A, and 418C do not move, and the volume values of the audio devices 3A and 3C do not change.

When a user completes the slide manipulation on the slider 418B, individual control of the volume value of the audio device 3B ends. The volume value of the audio device 3B is finalized at the moment when manipulation of the slider 418B is stopped.

In this way, it is possible to individually control the volume value of the audio device 3B corresponding to the slider 418B, among the audio devices 3A, 3B, and 3C connected to the network, by manipulating the slider 418B, which is an individual manipulatable part. For this reason, it is possible to adjust only the volume value of the audio device 3B.

Also, even when the slider 418B corresponding to the audio device 3B, which is a slave device, is manipulated, the slider 418S, which is an interlocking manipulatable part, and the sliders 418A and 418C corresponding to the audio devices 3A and 3C do not move. For this reason, it is possible to change the relative relationship of the volume values of the audio devices 3A, 3B, and 3C constituting the synchronous playback group.

Although a detailed description is omitted, when the slider 418C corresponding to the audio device 3C, which is a slave device, is manipulated, only the volume value of the audio device 3C is controlled, with the other sliders 418S, 418A, and 418B not moving.

When the volume value of an audio device is raised or lowered by manipulation of the slider 418 (418S, 418A, 418B, 418C), the change in this volume value is transmitted to the corresponding audio devices by the message editing and transmitting unit 130 as a command message.

[2. The Case of the Audio Device 3A being a Slave Device, and Volume Adjustment of the Audio Device 3A being Possible]

Next, the case of the function as a slave device being assigned to the audio device 3A, and the speaker system 60 being connected to the audio device 3A, whereby the volume value of the audio device 3A can be adjusted, is explained. The function of the master device shall be assigned to the audio device 3B.

Figure 8:
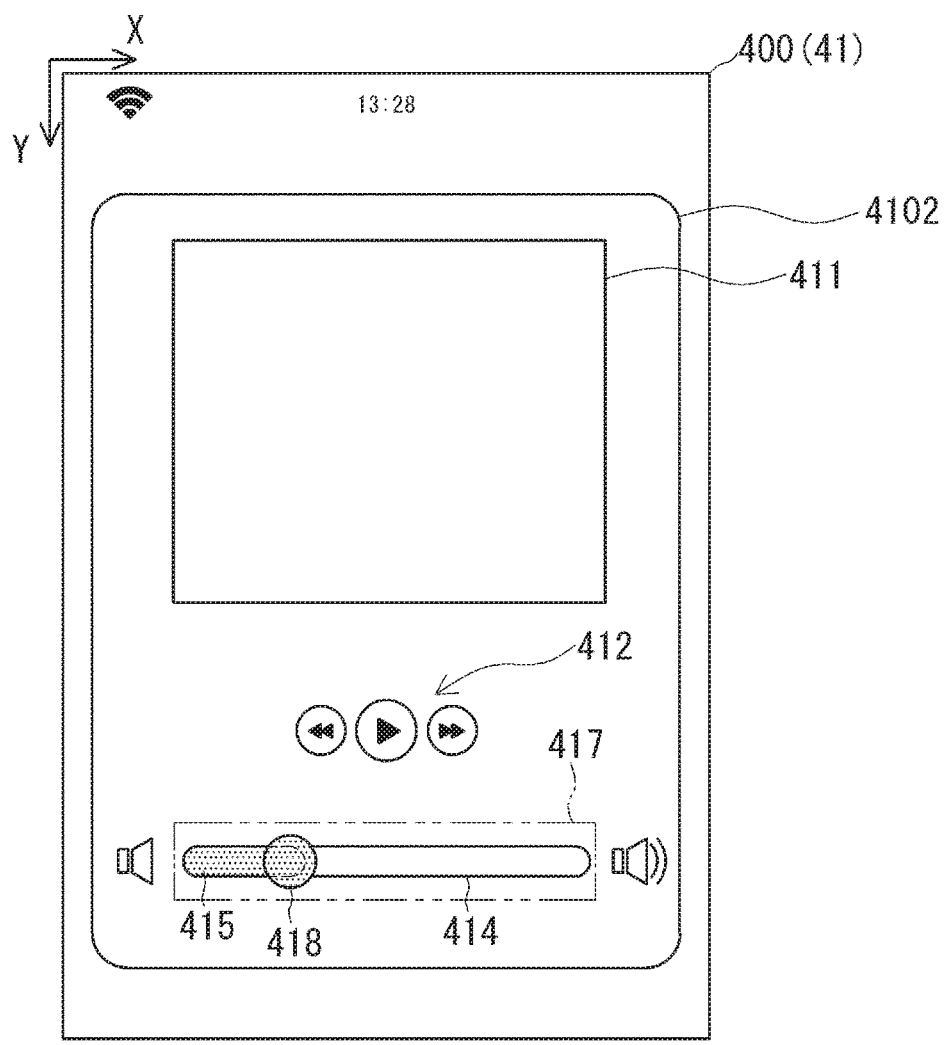
FIG. 8 is a diagram showing an example of a screen display of the audio system controller shown in FIG. 2.

FIG. 8 shows the state of a playback control screen 4102 of the audio device 3B, which is the current master device, displayed in the manipulation screen 400. Since the volume of the audio device 3B is adjustable, the bar graph 415 and the slider 418 are displayed in the playback control screen 4102. When the slider 418 is moved rightward, the volume value of the audio device 3B increases, and when the slider 418 is moved leftward, the volume value of the audio device 3B decreases.

Figure 9:
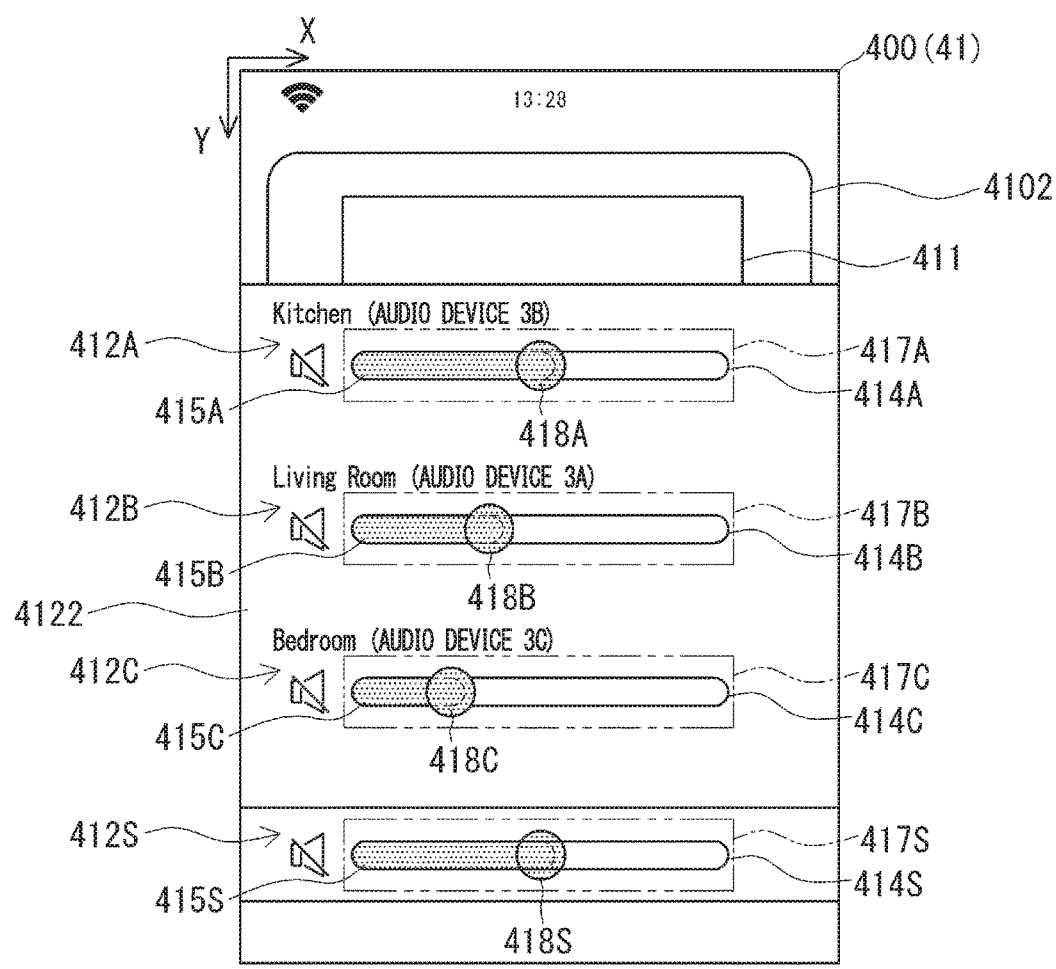
FIG. 9 is a diagram showing an example of a screen display of the audio system controller shown in FIG. 2.

FIG. 9 shows the state of the display of a volume control screen 4122 for adjusting individually or interlockingly the volumes of the audio devices 3A, 3B, and 3C. The volume control screen 4122 is displayed when performing volume control of a synchronous playback group.

The volume control screen 4122 has the synchronous control display region 412S and the individual control display regions 412A, 412B, and 412C.

Volume adjustment is possible for the audio device 3B, which is the master device. For this reason, an image for synchronous control is displayed in the synchronous control display region 412S.

An image for carrying out individual control of the volume value of the master device is displayed in the individual control display region 412A. In FIG. 9, since the function of the master device is assigned to the audio device 3B, an image for carrying out individual control of the volume value of the audio device 3B is displayed.

Images for carrying out individual control of the volume values of the slave devices are shown in the individual control display regions 412B and 412C. In FIG. 9, an image for individually controlling the volume value of the audio device 3A is displayed in the individual control display region 412B. Also, an image for individually controlling the volume value of the audio device 3C is displayed in the individual control display region 412C. By individually manipulating the slider 418B and the slider 418C, it is possible to individually control the volume values of the audio devices 3A and 3C.

[3. The Case of the Audio Device 3A being a Master Device, and Volume Adjustment of the Audio Device 3A not being Possible]

Next, the case of the function as a master device being assigned to the audio device 3A, and the speaker system 60 not being connected to the audio device 3A, whereby the volume value of the audio device 3A is not adjustable, is described.

Figure 10:
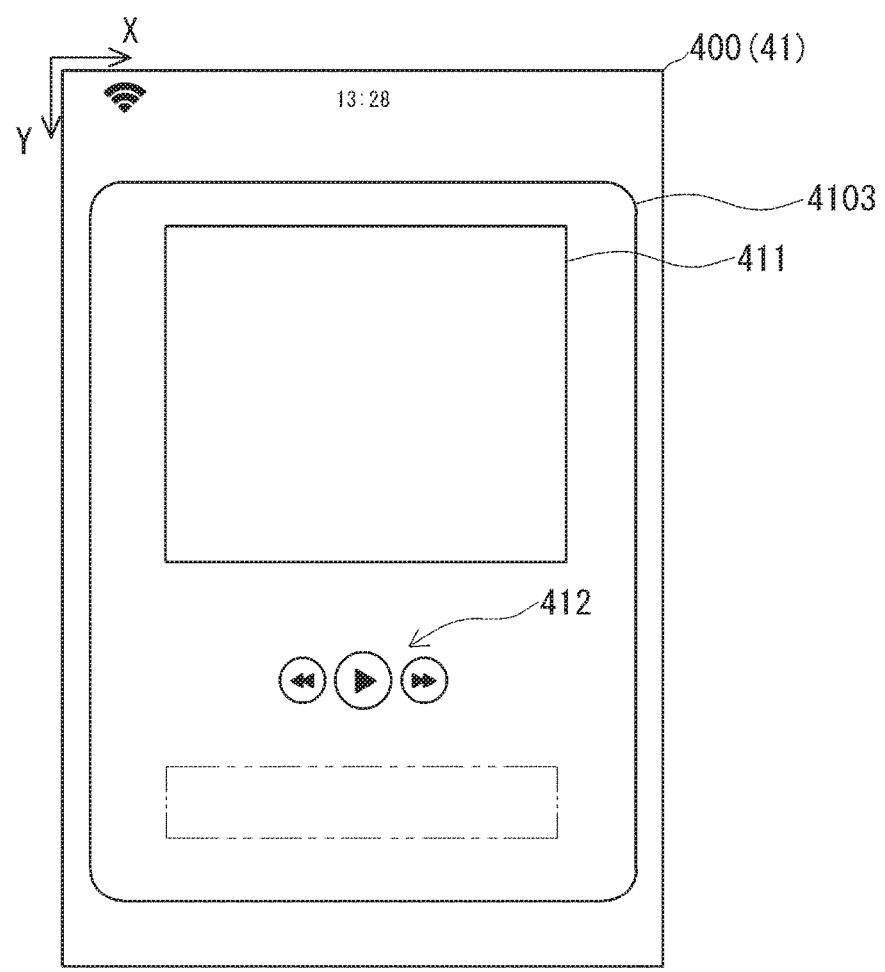
FIG. 10 is a diagram showing an example of a screen display of the audio system controller shown in FIG. 2.

FIG. 10 shows the state of a playback control screen 4103 of the audio device 3A, which is the current master device, that is displayed in the manipulation screen 400. Since volume adjustment of the audio device 3A is not possible, a bar graph and a slider for adjusting the volume are not displayed in the playback control screen 4103. On the other hand, since playback and stopping of the music source of the audio device 3A are possible, the playback button group 412 is displayed.

FIG. 11 shows the state of the display of a volume control screen 4123 for adjusting individually or interlockingly the volumes of the audio devices 3B and 3C. The volume control screen 4123 is displayed when performing volume control of a synchronous playback group.

The volume control screen 4123 has the synchronous control display region 412S and the individual control display regions 412A, 412B, and 412C.

Volume adjustment is not possible for the audio device 3A that is the master device. For this reason, an image for synchronous control is not displayed in the synchronous control display region 412S. Even when an image for synchronous control is not displayed, it is possible to display items other than volume adjustment, for example, a Bluetooth transmission setting menu, a sleep timer setting menu, and the like.

Although an image for individually controlling the volume value of the master device is displayed in the individual control display region 412A, volume adjustment is not possible for the audio device 3A, which is the master device. For this reason, in FIG. 11, an image for individually controlling the volume value of the audio device 3A is not displayed in the individual control display region 412A. In this case, the volume value of the audio device 3A is fixed to 0 dB (the maximum volume value).

An image for individually controlling the volume values of a slave device is displayed in the individual control display regions 412B and 412C. In FIG. 11, an image for individually controlling the volume value of the audio device 3A is displayed in the individual control display region 412B. Also, an image for individually controlling the volume value of the audio device 3C is displayed in the individual control display region 412C. By individually manipulating the slider 418B and the slider 418C, it is possible to individually control the volume values of the audio devices 3A and 3C.

In this way, on the basis of a query by the state acquisition unit 140, items that cannot be selected or adjusted (volume value) are not displayed, and items that can be selected or adjusted (playback and stopping of a music source) are displayed. As a result, even when a plurality of audio devices 3A, 3B, 3C with different items that can be selected and adjusted are combined, the audio system control 100 can be made to correspond.

[4. The Case of the Audio Device 3A being a Slave Device, and Volume Adjustment of the Audio Device 3A not being Possible]

Next, the case of the function as a slave device being assigned to the audio device 3A, and the speaker system 60 not being connected to the audio device 3A, whereby the volume value of the audio device 3A is unadjustable, is described. The function of the master device shall be assigned to the audio device 3B.

Figure 12:
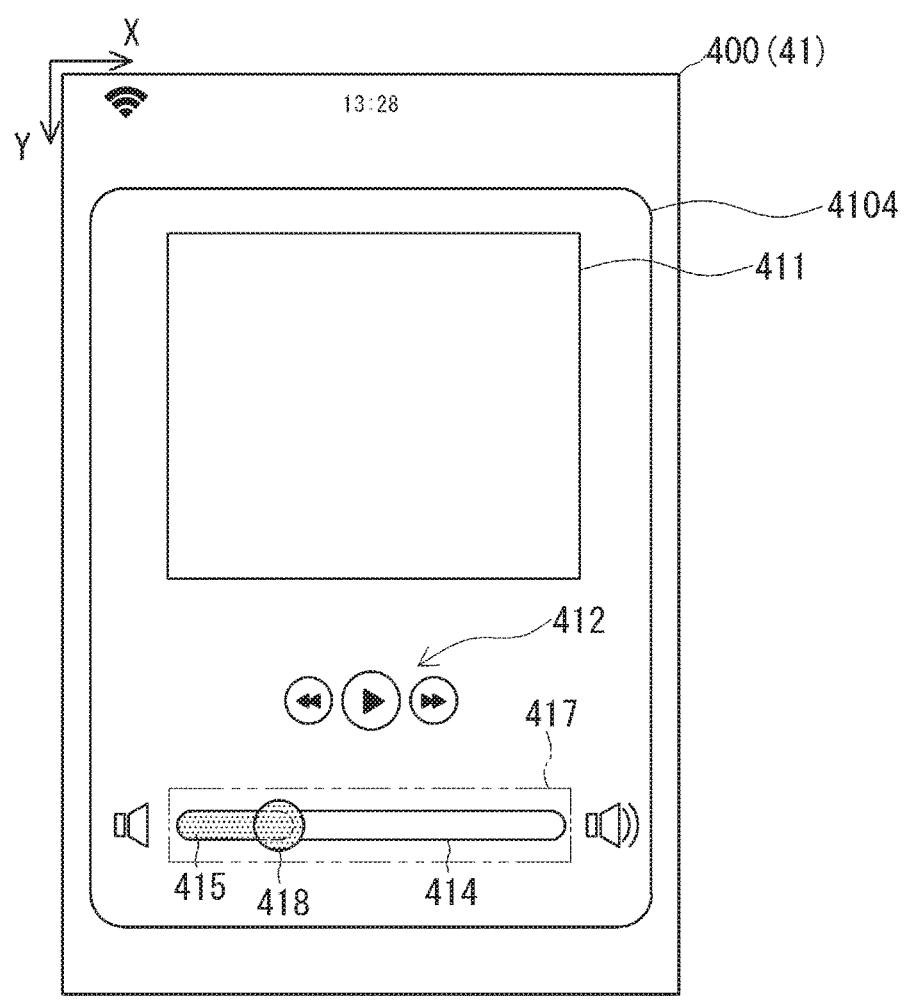
FIG. 12 is a diagram showing an example of a screen display of the audio system controller shown in FIG. 2.

FIG. 12 shows the state of a playback control screen 4104 of the audio device 3B, which is the current master device, displayed in the manipulation screen 400. Since the volume of the audio device 3A is adjustable, the bar graph 415 and the slider 418 are displayed in the playback control screen 4102. When the slider 418 is moved rightward, the volume value of the audio device 3B increases, and when the slider 418 is moved leftward, the volume value of the audio device 3B decreases.

Figure 13:
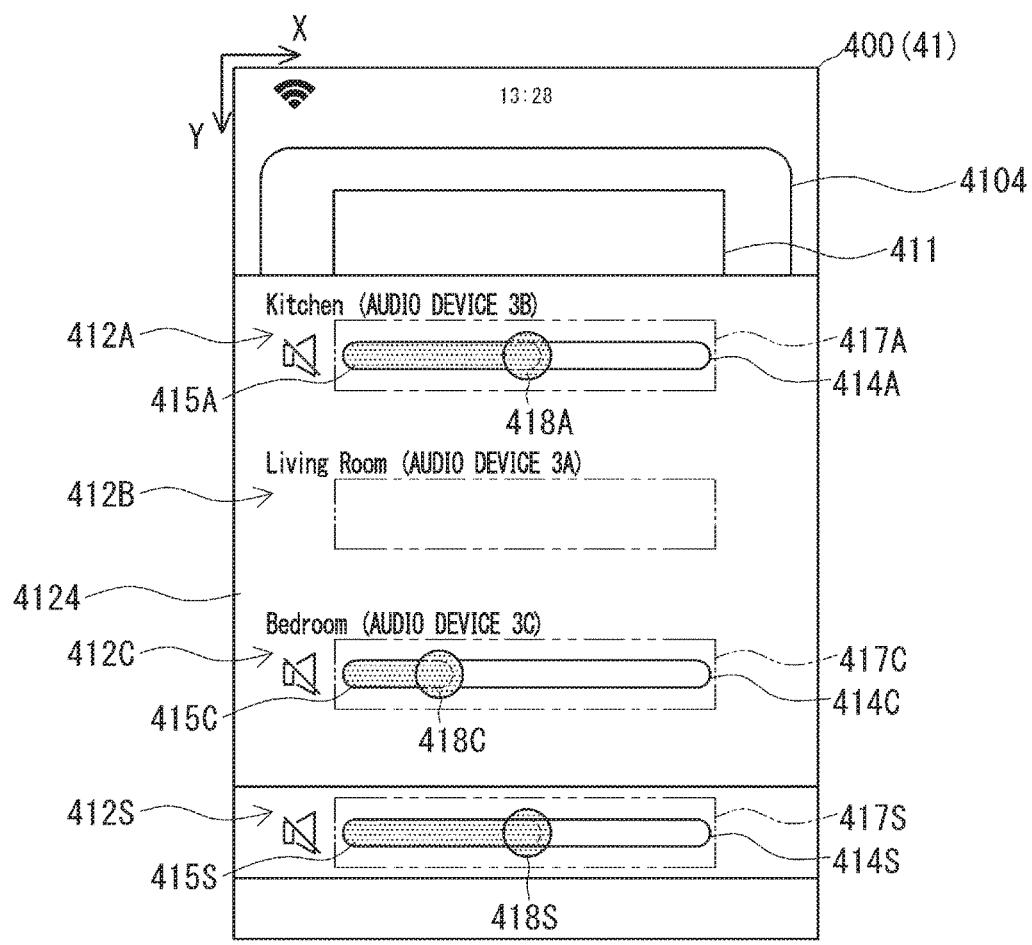
FIG. 13 is a diagram showing an example of a screen display of the audio system controller shown in FIG. 2.

FIG. 13 shows the state of the display of a volume control screen 4124 for adjusting individually or interlockingly the volume values of the audio devices 3B and 3C. The volume control screen 4124 is displayed when performing volume control of a synchronous playback group.

The volume control screen 4122 has the synchronous control display region 412S and the individual control display regions 412A, 412B, and 412C.

Volume adjustment is possible for the audio device 3B, which is the master device. For this reason, an image for synchronous control is displayed in the synchronous control display region 412S.

An image for carrying out individual control of the volume value of the master device is displayed in the individual control display region 412A. In FIG. 13, since the function of the master device is assigned to the audio device 3B, an image for individually controlling the volume value of the audio device 3B is displayed.

Images for individually controlling the volume values of the slave devices are shown in the individual control display regions 412B and 412C. In FIG. 13, since volume adjustment of the audio device 3A is not possible, an image for individually controlling the volume value of the audio device 3A is not displayed in the individual control display region 412B. In this case, the volume value of the audio device 3A is fixed to 0 dB (the maximum volume value), and even when the master slider 418S is manipulated, the volume value does not change. Also, an image for individually controlling the volume value of the audio device 3C is displayed in the individual control display region 412C. By manipulating the slider 418C, it is possible to individually control the volume value of the audio device 3C.

In this way, on the basis of a query by the state acquisition unit 140, items that cannot be selected or adjusted (volume value) are not displayed, and items that can be selected or adjusted (playback and stopping of a music source) are displayed. As a result, even when a plurality of audio devices 3A, 3B, 3C with different items that can be selected and adjusted are combined, the audio system control 100 can be made to correspond.

The afore-described embodiment does not display an image such as a volume slider for an audio device for which volume control is not possible, but is not limited to such a case. When volume control is not possible, an image such as a volume slider that is fixed to the maximum volume value (0 dB) may also be displayed in a grayed out (inoperable) state. The fixed value in the case of the volume not being controllable is not limited to the maximum volume value or 0 dB.

Although a mobile phone 1 is given above as an example of a terminal device to which the embodiment of the present invention is applied, the terminal device is not limited to the mobile phone 1. The terminal device may also be for example a tablet or a special-purpose controller terminal device.

Although the volume value has been given as an example, the present embodiment can be applied to any other parameter provided it is a parameter to be interlockingly or individually increased/decreased.

A parameter control device according to the embodiment of the present invention is provided with a display unit that displays a first screen for manipulating a parameter of a controllable device, and that displays a second screen indicating it is not possible to update the parameter when determined that it is not possible to update the parameter; and a parameter updating unit that updates the parameter, and when determined that it is not possible to update the parameter, fixes the parameter to a predetermined value. The display unit may display as the first screen a screen including a manipulatable part that receives a manipulation to the parameter. The display unit may display as the second screen a screen in which the manipulatable part is not displayed or a screen in which the parameter is fixed to a predetermined value. The parameter updating unit may update the parameter in accordance with a manipulation received by the manipulatable part. The parameter control device may be further provided with a state acquisition unit that inquires with the controllable device about the state of the controllable device. The display unit may display the second screen when determined that it is not possible to update the parameter on the basis of the state of the controllable device. The parameter updating unit may fix the parameter to the predetermined value when determined that it is not possible to update the parameter on the basis of the state of the controllable device.

In the aforementioned parameter control device, the controllable device may include a plurality of controllable devices including a master device. The display unit may display a plurality of individual manipulatable parts that are respectively associated with the plurality of controllable devices, and an interlocking manipulatable part that is associated with the master device. The parameter updating unit, when a manipulation is received by any one individual manipulatable part among the plurality of individual manipulatable parts, may change a parameter of the controllable device associated with the one individual manipulatable part in an interlocking manner with the manipulation amount received by the one individual manipulatable part. The parameter updating unit, when a manipulation is received by the interlocking manipulatable part, changes each of the parameters not fixed to the predetermined value among the parameters of the plurality of controllable devices in an interlocking manner with the manipulation amount received by the interlocking manipulatable part.

In the parameter control device, the parameter may be the volume of the audio device.

A device system according the embodiment of the present invention includes a controllable device that is constituted to be connectable with a subordinate device, and a parameter control device that is provided with a parameter updating unit that transmits to the controllable device a command instructing updating of a parameter. The controllable device, upon receiving the command from the parameter control device, controls the subordinate device to update the parameter of the subordinate device. The parameter control device may be further provided with a display unit that displays a manipulatable part that receives a manipulation to the parameter. The parameter updating unit may transmit the command to the controllable device in accordance with the manipulation received by the manipulatable part. The controllable device may not have the parameter updating function. The subordinate device may have the parameter updating function.

In the device system, the parameter control device may be further provided with a state acquisition unit that transmits to the controllable device an inquiry about whether or not updating of the parameter is possible. The controllable device, in the case of the subordinate device being connected to the controllable device, may transmit as a reply to the inquiry a reply indicating that updating of the parameter is possible. The controllable device, in the case of the subordinate device not being connected to the controllable device, may transmit as a reply to the inquiry a reply indicating that updating of the parameter is not possible. When the state acquisition unit of the parameter control device has acquired a reply indicating that updating of the parameter is not possible, the parameter updating unit may fix the parameter to a predetermined value, and the display unit may display a screen indicating it is not possible to update the parameter. The display unit may display a screen in which the manipulatable part is not displayed or a screen in which the parameter is fixed to a predetermined value as a screen indicating it is not possible to update the parameter. The device system may further include the subordinate device.

In the device system, the parameter may be the volume of an audio signal.

A parameter control program according to the embodiment of the present invention causes a portable terminal device to function as a display unit that displays a first screen for manipulating a parameter of a controllable device, and that displays a second screen indicating it is not possible to update the parameter when determined that it is not possible to update the parameter; and a parameter updating unit that updates the parameter, and when determined that it is not possible to update the parameter, fixes the parameter to a predetermined value. The display unit may display as the first screen a screen including a manipulatable part that receives a manipulation to the parameter. The display unit may display as the second screen a screen in which the manipulatable part is not displayed or a screen in which the parameter is fixed to a predetermined value. The parameter updating unit may update the parameter in accordance with a manipulation received by the manipulatable part. The parameter program may cause the portable terminal device to further function as a state acquisition unit that inquires with the controllable device about the state of the controllable device. The display unit may display the second screen when determined that it is not possible to update the parameter on the basis of the state of the controllable device. The parameter updating unit may fix the parameter to the predetermined value when determined that it is not possible to update the parameter on the basis of the state of the controllable device.

In the aforementioned parameter control program, the controllable device may include a plurality of controllable devices including a master device. The display unit may display a plurality of individual manipulatable parts that are respectively associated with the plurality of controllable devices, and an interlocking manipulatable part that is associated with the master device. The parameter updating unit, when a manipulation is received by any one individual manipulatable part among the plurality of individual manipulatable parts, may change a parameter of the controllable device associated with the one individual manipulatable part in an interlocking manner with the manipulation amount received by the one individual manipulatable part. The parameter updating unit, when a manipulation is received by the interlocking manipulatable part, changes each of the parameters not fixed to the predetermined value among the parameters of the plurality of controllable devices in an interlocking manner with the manipulation amount received by the interlocking manipulatable part.

The present invention may be applied to a parameter control device, a parameter control program, and a parameter control method.

While the embodiments of the invention have been described and illustrated above, the present invention is not limited to the above embodiments. Various modifications can be made without departing from the scope of the present invention.

What is claimed is:

1. A control device comprising:
a display;
a memory storing instructions;
at least one processor configured to implement the instructions to execute a plurality of tasks, including:
a determining task that determines whether a volume parameter of an audio-device is changeable,
a display task that displays, in the display:
in a case where the determining task determines that the volume parameter of the audio device is changeable, a first screen for allowing a user to manipulate the volume parameter of the audio device to change the volume parameter of the audio device;
in a case where the determining task determines that the volume parameter of the audio device is not changeable, a second screen and lock the volume parameter of the audio device; and
a play back task that that plays back an audio source in response to receiving a user instruction for play back, regardless of whether the volume parameter is changeable or not.

2. The control device according to claim 1, wherein:
the first screen includes a manipulatable part that allows the user to manipulate to change the volume parameter, and
the second screen does not display the manipulatable part or displays the volume parameter fixed to a predetermined value.

3. The control device according to claim 2, wherein the plurality of tasks include a volume changing task that changes the volume parameter in accordance with a manipulation of the manipulatable part.

4. The control device according to claim 1, wherein:
the plurality of tasks include an inquiring task that inquires the audio device about a state of the audio device, and
the determining task determines whether the volume parameter of the audio device is changeable based on the state of the the audio device.

5. The control device according to claim 2, further including:
a plurality of ones of the audio device, including a master device,
wherein the display task:
displays a plurality of individual manipulatable parts and an interlocking manipulatable part on the display, the plurality of individual manipulatable parts being respectively associated with the plurality of audio devices, the interlocking manipulatable part being associated with the master device,
wherein the plurality of tasks include a volume changing task that:
in a case where one individual manipulatable part, among the plurality of individual manipulatable parts, receives a manipulation, changes the volume parameter of the audio device associated with the one individual manipulatable part, while changing each of the volume parameters not fixed to the predetermined value, among the volume parameters of the plurality of audio devices, in an interlocking manner with an amount of the manipulation by the one individual manipulatable part.

6. The control device according to claim 1, wherein the plays back task plays a same audio source synchronously with another audio device.

7. A device system comprising:
an audio device configured to be connectable with a subordinate device; and
a parameter control device including:
   a first memory storing first instructions; and
   at least one first processor configured to implement the first instructions to execute a plurality of first tasks, including:
      a display task that displays, on a display, a manipulatable part for allowing a user to manipulate a volume parameter of the subordinate device;
      a state acquisition task that transmits to the audio device an inquiry about whether changing of the volume parameter of the subordinate device is possible,
      a first volume parameter changing task that transmits to the audio device a command instructing changing of the volume parameter of the subordinate device, in accordance with the manipulation of the manipulatable part, in a case where changing of the volume parameter is possible,
wherein the audio device includes:
   a second memory storing second instructions; and
   at least one second processor configured to implement the second instructions to execute a plurality of second tasks, including:
      a reply transmitting task that transmits, as a reply to the inquiry made by the state acquisition task:
         a first reply indicating that changing of the volume parameter of the subordinate device is possible, in a case where the subordinate device is connected to the audio device; and
         a second reply indicating that changing of the volume parameter of the subordinate device is not possible, in a case where the subordinate device is not connected to the audio device;
      a second volume parameter changing task that controls the subordinate device to change the volume parameter of the subordinate device, upon receiving the command from the parameter control device, in a case where the subordinate device is connected to the audio device; and
      a play back task that plays an audio source in response to receiving a user instruction for play back, regardless of whether the volume parameter is changeable or not, wherein in a case where the state acquisition task acquires the reply indicating that changing of the volume parameter is not possible, the first volume parameter changing task fixes the volume parameter to a predetermined value or the display task displays a screen on the display indicating that changing of the volume parameter is not possible.

8. The device system according to claim 7, wherein the display-task does not display, in the screen, the manipulatable part or displays the screen where the volume parameter is fixed to the predetermined value, in a case where the state acquisition task acquires the reply indicating that changing of the volume parameter is not possible.

9. The device system according to claim 7, further including the subordinate device.

10. The device system according to claim 7, wherein the subordinate device includes a speaker.

11. The device system according to claim 7, wherein the plays back task plays a same audio source synchronously with another audio device.

12. A parameter control method comprising the steps of:
   determining whether a volume parameter of an audio device is changeable;
   displaying, in a display, a first screen for allowing a user to manipulate the volume parameter of the audio device to change the volume parameter of the audio device, in a case where the determining step determines that the volume parameter of the audio device is changeable;
   displaying, in the display, a second screen indicating that changing of the volume parameter of the audio device is not possible in a case where the determining step determines that the volume parameter of the audio device is not changeable;
   changing the volume parameter of the audio device in a case where the determining step determines that the volume parameter of the audio device is changeable;
   fixing the volume parameter to a predetermined value in a case where the determining step determines that the volume parameter is not changeable; and
   playing an audio source in the audio device in response to receiving a user instruction for play back, regardless of whether the volume parameter is changeable or not.

13. The parameter control method according to claim 12, wherein the playing step plays a same audio source synchronously with another audio device.

* * * * *